July 26, 1932.  L. H. MAHON  1,868,668

GLAND PACKING

Filed Sept. 12, 1929

Lee H. Mahon  Inventor

By Jesse R. Stone

Attorney

Patented July 26, 1932

1,868,668

UNITED STATES PATENT OFFICE

LEE HENRY MAHON, OF LIBERTY, TEXAS, ASSIGNOR OF ONE-HALF TO H. H. SLOAN, OF HOUSTON, TEXAS

GLAND PACKING

Application filed September 12, 1929. Serial No. 392,023.

My invention relates to packing such as is employed in stuffing boxes or for sealing the space about a shaft or rod adapted to move within a fluid pressure chamber.

It is an object to provide a packing sleeve to seal about a rod or shaft and which is assisted in its operation by the pressure fluid, such as air, steam or water.

I desire to so construct the packing that leakage of pressure fluid from the pressure side will engage the packing and force the same into close contact with the shaft so that said fluid cannot escape past the packing.

It is a further object to form a single unitary sleeve which is constructed to closely seal the space within a stuffing box about the moving part.

In the drawing herewith Fig. 1 is a central longitudinal section through a packing sleeve constructed in accordance with my invention.

Figure 1:
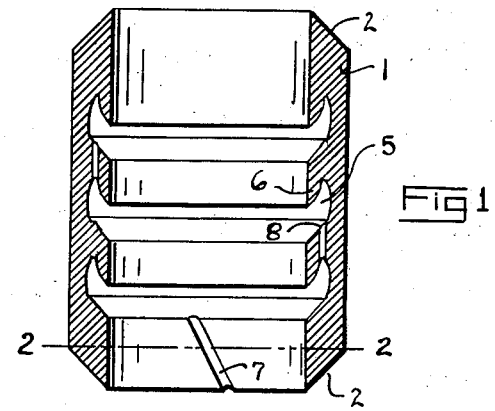
Figure 2:
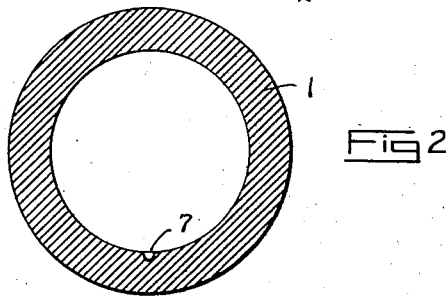
Fig. 2 is a transverse sectional view of the sleeve taken on the plane 2—2 of Fig. 1.
Figure 3:
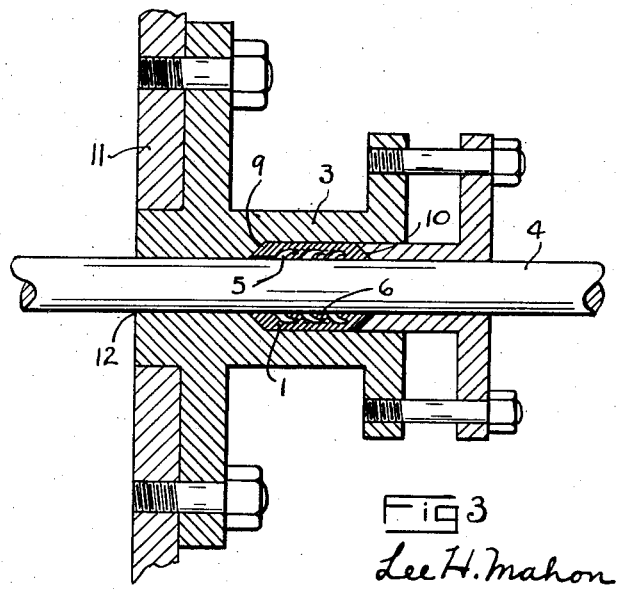
Fig. 3 is a sectional view through a stuffing box with my sleeve shown therein.

My packing comprises a sleeve 1 of rubber or similar compressible composition. It is preferably beveled at its ends at 2 so as to fit within the stuffing box 3 as shown in Fig. 3. The outer surface is formed to fit the particular seat in which it is to be used and may be cylindrical to fit a stuffing box of that form.

The interior face is formed to fit about a cylindrical shaft or rod as illustrated at 4 in Fig. 3. Said inner face is formed with circumferential grooves 5 which are undercut in one direction to form lips or cups 6 presented in the direction of the pressure chamber so that the fluid may engage in the grooves below the lips 6 and force them toward the rod or shaft. I have shown three such lips on a packing sleeve of ordinary length, altho any other desired number may be used.

To allow the entrance of pressure fluid to the grooves below the lips I prefer to cut a channel 7 on the inner face of the sleeve at the end toward the pressure chamber and also passages 8 from one groove 5 to the adjacent one to allow the fluid to reach all the grooves.

When this sleeve is employed in a stuffing box such as is shown in Fig. 3, the tapered ends of the packing sleeve are received within the tapered seats 9 and 10 of the box and gland respectively and the tightening of the gland will compress the sleeve longitudinally in the usual manner.

The rod 4 may be a reciprocating rod or a rotatable shaft. The wall of the pressure chamber is indicated at 11 and it may be understood that this is a cylinder head, a steam chamber or any similar structure. The pressure fluid, steam, or the like, will tend to escape outwardly along the shaft at 12 and will enter through the groove 7 and passage 8 to the space beneath the lips 6 and force them into tight sealing contact with the rod 4 and prevent further escape of the fluid.

My device has the advantage of being simple, easily installed and is capable of preserving an exceptionally tight seal with the rod to prevent leakage.

What I claim as new is:

A packing sleeve adapted to fit within a stuffing box, the inner surface of said sleeve having circumferential grooves undercut to form lips extending in from the body of the sleeve and in the direction of the fluid pressure, and passages from the fluid pressure end of said sleeve through said lips into said grooves.

In testimony whereof I hereunto affix my signature this 7th day of September, A. D. 1929.

LEE HENRY MAHON.